(12) United States Patent
Gibboney

(10) Patent No.: US 7,609,006 B2
(45) Date of Patent: Oct. 27, 2009

(54) LED LIGHT STRING WITH SPLIT BRIDGE RECTIFIER AND THERMISTOR FUSE

(75) Inventor: James W. Gibboney, Conyers, GA (US)

(73) Assignee: Ventur Research and Development Corp., St. Augustine, FL (US)

( * ) Notice: Subject to any disclaimer, the term of this patent is extended or adjusted under 35 U.S.C. 154(b) by 0 days.

(21) Appl. No.: 12/362,665

(22) Filed: Jan. 30, 2009

(65) Prior Publication Data

US 2009/0206762 A1   Aug. 20, 2009

Related U.S. Application Data

(60) Provisional application No. 61/029,464, filed on Feb. 18, 2008.

(51) Int. Cl.
*H05B 37/00* (2006.01)
(52) U.S. Cl. ............... 315/200 R; 315/185 S; 315/205; 315/209 R; 315/312
(58) Field of Classification Search ........... 315/205, 315/207, 206, 200 R, 185 S, 200 A, 312–326
See application file for complete search history.

(56) References Cited

U.S. PATENT DOCUMENTS

| | | | |
|---|---|---|---|
| 4,675,575 A | 6/1987 | Smith et al. |
| 5,006,724 A | 4/1991 | Liu |
| 5,639,157 A | 6/1997 | Yeh |
| 5,777,868 A | 7/1998 | Gibboney, Jr. |
| 5,852,348 A | 12/1998 | Lin |
| 6,072,280 A | 6/2000 | Allen |
| 6,461,019 B1 | 10/2002 | Allen |
| 6,597,125 B2 | 7/2003 | Janning |
| 6,641,294 B2 | 11/2003 | Lefebvre |
| 6,765,313 B2 | 7/2004 | Janning |
| 6,830,358 B2 | 12/2004 | Allen |
| 6,972,528 B2 | 12/2005 | Shao |
| 7,029,145 B2 | 4/2006 | Frederick |
| 7,042,116 B2 | 5/2006 | Janning |
| 7,086,758 B2 | 8/2006 | Janning |
| 7,138,770 B2 | 11/2006 | Uang et al. |
| 7,166,968 B2 | 1/2007 | Janning |
| 7,175,302 B2 | 2/2007 | Kazar et al. |
| 7,250,730 B1 | 7/2007 | Allen |

(Continued)

*Primary Examiner*—Tuyet Vo
(74) *Attorney, Agent, or Firm*—Michael A. Mann; Nexsen Pruet, LLC

(57) ABSTRACT

A string of lights has an electrical plug at one end and a receptacle at the other end and plural light-emitting diodes (LEDs) in series with a negative temperature coefficient (NTC) thermistor. The device also includes a bridge rectifier providing direct current to the LEDs and the thermistor but split between the plug and receptacle of the light string so that alternating current from the plug is delivered to the receptacle but direct current flow through the LEDs. Light string fuses protect the string but the NTC fuses protect the LEDs at a lower current rating. The LEDs can be arranged in a simple electrical series, or, in an alternative embodiment, an electrical series of groups of plural LEDs each of which is arranged electrically in parallel with other LEDs of the same group. The use of the lower-current-rating NTC thermistor allows the LEDs in one light string to fail without necessarily jeopardizing the current flow to subsequent light strings unless the current is high enough to blow the light string fuses in the plug.

7 Claims, 1 Drawing Sheet

U.S. PATENT DOCUMENTS

| | | |
|---|---|---|
| 7,265,496 B2 | 9/2007 | Allen |
| 7,276,858 B2 * | 10/2007 | Allen .................. 315/205 |
| 7,279,809 B2 | 10/2007 | Janning |
| 7,344,275 B2 | 3/2008 | Allen et al. |
| 7,377,802 B2 | 5/2008 | Allen |
| 7,449,839 B1 * | 11/2008 | Chen .................. 315/200 A |
| 2002/0145392 A1 | 10/2002 | Hair, III et al. |
| 2002/0149938 A1 | 10/2002 | Allen |
| 2003/0015968 A1 | 1/2003 | Allen |
| 2003/0198048 A1 | 10/2003 | Frederick |
| 2004/0046510 A1 | 3/2004 | Allen |
| 2004/0201988 A1 | 10/2004 | Allen |
| 2005/0041423 A1 | 2/2005 | Janning |
| 2005/0122723 A1 | 6/2005 | Frederick |
| 2005/0174065 A1 | 8/2005 | Janning |
| 2006/0007679 A1 * | 1/2006 | Allen .................. 362/227 |
| 2007/0018594 A1 | 1/2007 | Janning |
| 2007/0063657 A1 * | 3/2007 | Wu .................. 315/205 |
| 2007/0127242 A1 | 6/2007 | Allen et al. |
| 2007/0171159 A1 * | 7/2007 | Lee .................. 345/83 |
| 2008/0084695 A1 | 4/2008 | Hsu |
| 2008/0116816 A1 | 5/2008 | Neuman et al. |
| 2008/0157688 A1 | 7/2008 | Gibboney |

\* cited by examiner

LED LIGHT STRING WITH SPLIT BRIDGE RECTIFIER AND THERMISTOR FUSE

CROSS REFERENCE TO RELATED PATENTS

The priority benefit of U.S. provisional patent application Ser. No. 61/029,464, filed Feb. 18, 2008, is claimed, which application is incorporated herein in its entirety by reference.

BACKGROUND OF THE INVENTION

The present invention relates to strings of lights used for decorating during holiday times.

Typical light strings consist of plural lamps electrically wired together in series or in parallel. There is an electrical plug at one end of the string adapted for being inserted into a wall socket or other source of electricity, and a receptacle at the other end adapted to receive a plug from a second light string and to deliver electricity to a second light string. Most lights strings operate on alternating, household current. More recently, some light strings have been made to operate on direct current produced by a rectifier placed in the plug or in the receptacle, as disclosed, for example, by the present applicant in U.S. Pat. No. 5,777,868, U.S. Pat. No. 5,994,845 and U.S. Pat. No. 6,869,313. These light strings use less electricity and operate at lower temperatures, so they are less of a fire hazard than more conventional light strings that rely on alternating current. The advantage of the rectifier located in the plug is that only two wires are needed to bring electricity to the lamps. However, this type of direct current light string will deliver direct current to the receptacle at the other end, so the next light string must also operate on direct current.

The advantage of placing the rectifier in the receptacle is that the receptacle can deliver alternating current to the next light string, while delivering direct current to the lights in the first string. Unfortunately this arrangement requires an additional wire.

Light strings are made in the hundreds of millions of sets each year. Containing manufacturing costs is a significant objective of manufacturers of light strings, particularly when the costs of materials increase. Keeping costs low or reducing costs by reducing the amount of material and labor can be significant in the aggregate even when the incremental material or labor costs for a single string of lights is very small.

Additionally, as another way of improving light strings while keeping costs low, instead of incandescent lamps, LEDs are being used more and more for lights in light strings. LEDs as diodes, and unlike incandescent lamps, pass current in only one direction are therefore limited to direct current applications.

While LEDs operating on DC use less current and are cooler to the touch, they are not shunted as many conventional incandescent bulbs are. Shunts are to provide current flow to keep remaining lamps in the circuit lighted in the event of a filament burn out or mechanical failure. In incandescent lights, the filaments can act as fuses. However LEDs do not have shunts because most LEDs short out as hot junctions tend to melt the anode/cathode metals and they pool together forming a short circuit. Shorting of LEDs thus presents a problem that is not addressed in the prior art.

Thus there remains a need for producing LED light strings that are safe, use little electricity, are inexpensive to manufacture and still produce the desired decorative effect, while keeping manufacturing costs low.

SUMMARY OF THE INVENTION

According to its major aspects and briefly recited, the present invention is a string of LED lights powered on direct current while the string passes alternating current from the plug to the receptacle. The present light string employs a full wave rectifying bridge to produce the direct current required to power the LEDs, but the bridge is divided into a first part in the plug and a second part in the receptacle at the other end of the light string, with two diodes of the rectifier in the plug and the other two in the receptacle. Importantly, in the plug end is a fuse that is activated by a rise in circuit temperature, namely, a negative temperature coefficient (NTC) thermistor.

A feature of the present invention is the use of an NTC thermistor in the present split bridge circuit. In the event one or more of the LEDs in the series shorts, the shorted LED may heat up enough to become a fire hazard, as LEDs melt at a relatively low temperature. Furthermore, LEDs are often used to decorate artificial trees which, particularly when decorated, can burn readily.

The advantage of the split bridge rectifier is that it allows the circuit to deliver alternating current to the receptacle and DC to the LED load but with less conducting wire than would be required for an LED light string that had the rectifier in the receptacle because the wires used for delivering the AC to the receptacle can be used as part of the bridge.

In an alternate preferred embodiment, the lamps of the present light strings are groups of LEDs in arranged in a parallel configuration with the groups formed of an electrical series, with for example three LEDs electrically in parallel in each group and a large number of groups arranged in an electrical series.

These and other features and their advantages will be apparent to those skilled in the art of electric light strings from a careful reading of the Detailed Description of Preferred Embodiments accompanied by the following drawings.

DETAILED DESCRIPTION OF THE INVENTION

The present invention is a light string, such as might be used for holiday decorating. The present light string preferably uses plural light-emitting diodes (LEDs) rather than incandescent lights with the LEDs arranged in an electrical series with each other. A negative temperature coefficient (NTC) thermistor is placed in series with the LEDs. Alternatively, LEDs, as will be further described below, are arranged in groups of two or more electrically parallel LEDs are arranged electrically in series with each other group and with an NTC thermistor. Most preferably, when this series/parallel arrangement is used, a device is also placed in parallel with each group to regulate voltage in the event any of the LEDs in that group burn out or are lost, as described in U.S. Pat. No. 6,367,957, which is incorporated herein in its entirety.

Figure 1:
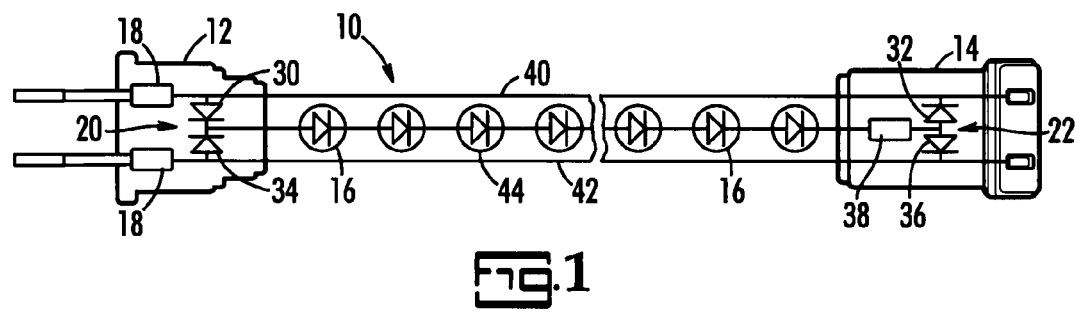
FIG. 1 is schematic diagram of a light string according to a preferred embodiment of the present invention.

Referring now to FIG. 1, at one end of a light string 10 is a plug 12 adapted for connecting to a source of alternating electrical current (AC) such as is accessible via a wall socket. At the other end of light string 10 is a receptacle 14 adapted to deliver AC to a subsequent light string when plug 12 is connected to a wall socket that is delivering AC to plug 12. Plural LEDs 16 are connected electrically in series between plug 12 and receptacle 14. Electrical current to light string 10 is limited by fuses 18; two fuses of approximately 3 amps are used for non-polarized plugs (as shown); one fuse 18 is needed in a polarized plug. In addition, a first NTC thermistor 38 is applied in plug 12 in series with plural LEDs 16.

Direct current (DC) is delivered to LEDs 16 of light string 10 by a bridge rectifier that is made in two parts. A first part 20 is connected at the first end of light string 10 and a second part 22 is connected to the second, opposing end of light string 10. Preferably, first part 20 is incorporated into plug 12 and second part 22 is incorporated into receptacle 14.

The first and second parts 20, 22, of rectifier have two diodes each. One diode 30 in plug 12 and one diode 32 in receptacle 14 pass current through LEDs 16 in the first half cycle; a second diode 34 in plug 12 and a second diode 36 in receptacle 14 pass current though LEDs 16 in the second half of the cycle, for full wave rectification. The two electrically conducting wires 40, 42, that pass AC from plug 12 to receptacle 14, also are used as part of the rectifier to complete the circuit during each half cycle. Accordingly only three wires are needed: two AC wires 40, 42 and one DC wire 44 that travels from plug 12 through NTC thermistor 38 and then to the first LED 16 of the electrical series of LEDs 16, then the second LED 16, then the third LED 16, and so forth. NTC thermistor 38 is preferably positioned before the first LED 16 in light string 10 after first part 20 of bridge rectifier.

Fuses 18, preferably rated at 3 amperes, are the only fuse protection for light string 10. If light string 10 is located in a series of light strings for decoration, such as, for example, six light strings all plugged together in series to span a roof line or decorate a tree, and one LED in one of the six light strings shorts, the voltage to the other LEDs in that set rises, making their lives shorter and leading to yet additional shorting. The additional shorting leads to a cascade of LED failures: shorting in one LED, raising the voltage and over-driving the remaining LEDs for even shorter life, which further raises the voltage and causes more shorting, until eventually, when enough LEDs short, one of fuses 18 in plug 12 will blow. When fuses 18 blow, then the remaining five light strings attached to the failed one would also go out because they are all in series. But by using NTC thermistor 38 with a rating lower than the 3 amps of fuses 18, thermistor 38 will blow before fuses 18 will blow. Yet, as long as the current in the six light strings remains below 3 amps, the failed light string 10 will still pass current to the adjacent five sets of this example.

The current rating of thermistor 38 must be sufficiently lower than the rating of fuses 18 (which are nominally 3 amps) but its exact rating will depend on the color or color mix of the LEDs as different colored LEDs have different current requirements. A 100 LED light string of typical colors or color mixes will easily operate at less than 0.5 amps. Thus, thermistor 38 could be specified to have a rating of approximately 1 amp. As long as the current in the LEDs is less than the rating of NTC thermistor 38, light string 10 will pass the current through the LEDs.

If that current is exceeded, the resistance of NTC thermistor 38 increases significantly and thereby lowers current flow, but only to the LEDs while AC power continues to pass through fuses 18 and to deliver electrical power to receptacle 14 and thence to adjacent LED light sets.

Alternatively to NTC thermistor 38, a fuse, fuse lamp, or bimetal switch (breaker) could also be used. Only one NTC thermistor 38 is necessary in the circuit to provide local protection of the LEDs only. However, NTC thermistors are preferred because of their sensitivity to heat.

Figure 2:
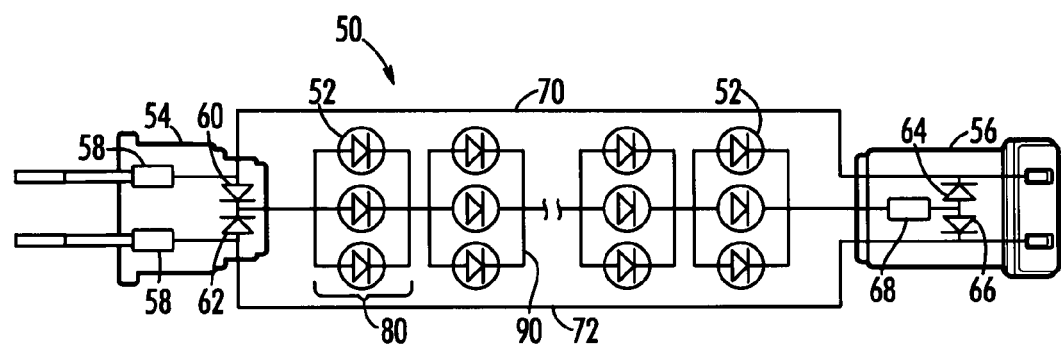
FIG. 2 is a diagram of an alternative LED string, according to a preferred embodiment of the present invention.

In FIG. 2, there is illustrated an alternative preferred embodiment of the present invention. FIG. 2 shows a light string 50 comprised of LEDs 52 between a plug 54 at a first end and a receptacle 56 at a second end. Electrical current-limiting fuses 58 are preferably used for a non-polarized plug 54; one fuse 58 is used for a polarized plug 54. Importantly, a NTC thermistor 68 is positioned in series with LEDs 52 in plug 54, in a manner similar to that of NTC thermistor 38 shown in FIG. 1.

A bridge rectifier receives alternating current from plug 54 and, through diodes 60, 62, at first end and diodes 64, 66, at second end delivers direct current to LEDs 52 while a first conductor 70 and a second conductor 72 deliver alternating current to receptacle 56 for use by a subsequent light string plugged into receptacle 56.

LEDs 52 are divided into groups 80 of LEDs 52, with each LED 52 in each group 80 being arranged electrically in parallel with each other LED 52 in group 80. Groups 80 are arranged electrically in series with each other. Of course, additional wiring 90 is needed to connect LEDs 80 in parallel but the additional wiring 90 adds additional lights.

The present light string 10, 50 allow AC to be delivered from plug 12, 54, to receptacle 14, 56 while delivering DC to LEDs 16, 52 and do so in such a way that the electrical conductors 40, 42, 70, 72 that deliver the AC to receptacle 14, 56 are part of the split bridge and thereby avoid the need for additional wiring to complete the circuit.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art from the foregoing description of the preferred embodiments without departing from the spirit or scope of the present invention.

What is claimed is:

1. A string of lights for use with a source of alternating electrical current, comprising:

plural light-emitting diodes arranged in a string having a first end and an opposing second end;

a plug adapted for connection to a source of alternating electrical current and connected to said first end of said string;

a receptacle opposing said plug and connected to said second end of said string, said plug adapted for providing a source of alternating electrical current when said plug is connected to said source of alternating electrical current;

a pair of electrical conductors connecting said plug and said receptacle so that said alternating electrical current is conducted from said plug to said receptacle;

a bridge rectifier having a first part and a second part, said first part of said bridge rectifier being located at said first end of said string, said second part of said bridge rectifier being located at said second end of said string, said first and said second ends of said bridge rectifier, upon receiving said alternating electrical current from said plug, rectifying said alternating electrical current to deliver direct electrical current for use by said plural light-emitting diodes, said pair of electrical conductors connecting said first and said second parts of said bridge rectifier; and a negative temperature coefficient thermistor in series with said plural light-emitting diodes of said string to prevent electrical current from flowing in said light string in the event in the event of a failure of a light-emitting diode of said series of light-emitting diodes while electrical current continues to flow in said pair of electrical conductors.

2. The string of lights as recited in claim 1, wherein said first part of said bridge rectifier includes two diodes and said second part of said bridge rectified includes two diodes.

3. The string of lights as recited in claim 1, wherein said first part of said bridge rectifier is in said plug.

4. The string of lights as recited in claim 1, wherein said second part of said bridge rectifier is in said receptacle.

5. The string of lights as recited in claim 1, wherein said plural light-emitting diodes are arranged electrically in series.

6. The string of lights as recited in claim 1, wherein said plural light-emitting diodes are arranged in an electrical series of groups of light-emitting diodes, each group of said groups having at least two light-emitting diodes arranged electrically in parallel.

7. The string of lights as recited in claim 6, wherein said at least two light-emitting diodes is three light-emitting diodes.

* * * * *